P. CATUCCI.
STOP MECHANISM FOR TALKING MACHINES.
APPLICATION FILED NOV. 16, 1916.
1,277,546.
Patented Sept. 3, 1918.
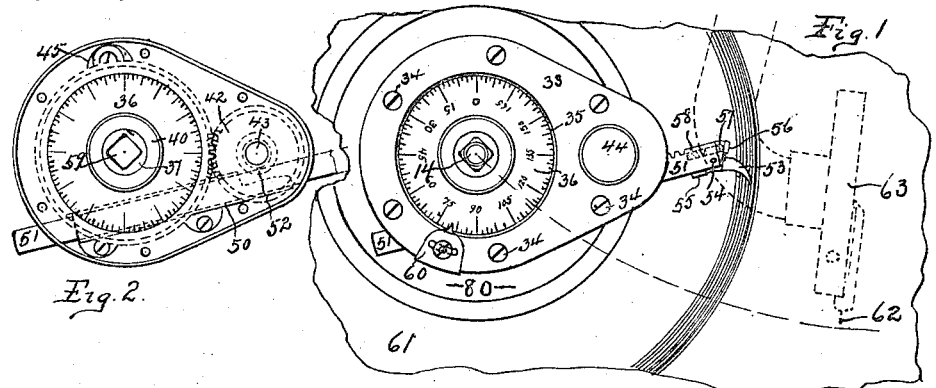
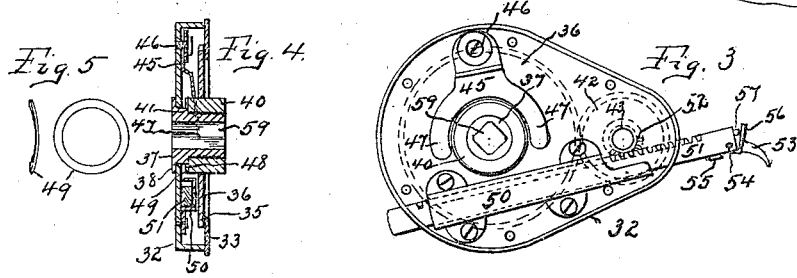
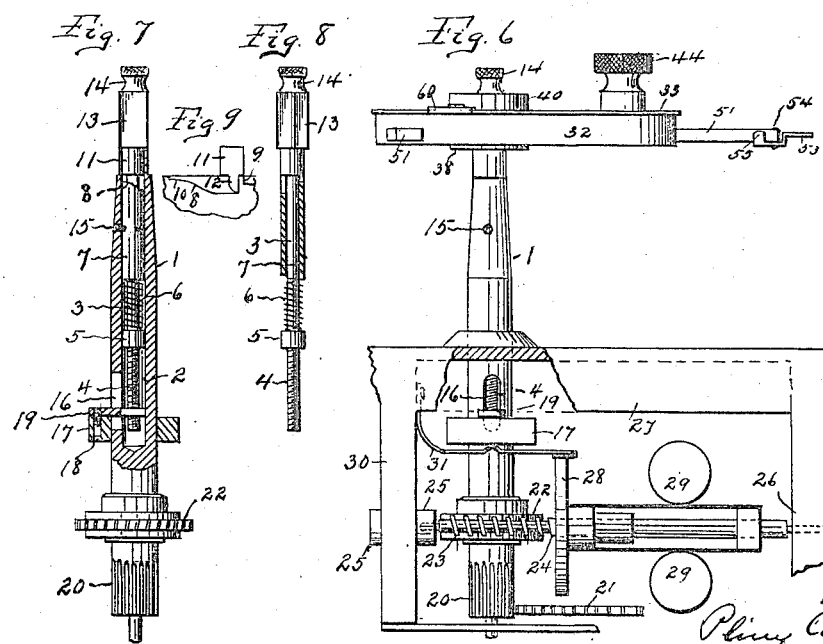
INVENTOR.
Pliny Catucci
BY
Louis M. Sanders ATTORNEYS.

UNITED STATES PATENT OFFICE.

PLINY CATUCCI, OF NEWARK, NEW JERSEY, ASSIGNOR, BY MESNE ASSIGNMENTS, TO OTTO HEINEMAN PHONOGRAPH SUPPLY CO., INC., OF NEW YORK, N. Y., A CORPORATION OF NEW YORK.

STOP MECHANISM FOR TALKING-MACHINES.

1,277,546.    Specification of Letters Patent.    Patented Sept. 3, 1918.

Application filed November 16, 1916. Serial No. 131,640.

*To all whom it may concern:*

Be it known that I, PLINY CATUCCI, a citizen of the United States, residing in the city of Newark, county of Essex, and State of New Jersey, have invented a new and useful Improvement in Stop Mechanism for Talking-Machines, of which the following is a specification.

My invention has for its object the provision of means for automatically stopping the motor of a talking machine upon the completion of the playing of the record, notwithstanding the fact that there may be quite a number of convolutions of the spiral groove upon the record following the sound record thereon. To the eye of the observer, these additional convolutions present no material difference in aspect from the record bearing convolutions, and their termination cannot therefore, serve as a guide for setting the stop mechanism, so as to stop the motor at the instant that the entire record has been played. In carrying out my invention, I provide the motor with a brake which is set from the mandrel, and mount upon the mandrel an indicator which I term a meter which may be accurately set to indicate a character which will correspond with a number upon the record indicating the point at which the sound record terminates; and when so set, the brake mechanism becomes instantly operative when the stylus has traversed the entire record.

In the accompanying drawings forming a part of this specification,

Figure 1 is a plan view of the meter part of my invention, shown as mounted upon a mandrel of a talking machine over a record.

Fig. 2 is a similar plan view of the meter with the cover removed.

Fig. 3 is a similar plan view, but with the cover and gears removed to show the interior arrangement of the meter case.

Fig. 4 is a cross-section on line IV—IV of Fig. 1.

Fig. 5 shows in plan and side view, the cambered spring washer detached from the meter.

Fig. 6 is a side elevation of a portion of a talking machine motor, showing the brake mechanism, with the meter mounted in place upon the mandrel.

Fig. 7 is a vertical section through the mandrel.

Fig. 8 is a detached view of the brake setting mechanism, partly in section.

Fig. 9 is a rectified plan of the cam upon said setting mechanism.

Similar letters of reference refer to like parts throughout the specification and drawings.

The mandrel 1, is drilled out for a portion of its length to form a tube, as shown in Fig. 7 at 2, to receive the operating mechanism. In this tubular portion is inserted the spindle 3. It will be noted that this spindle reaches nearly to the bottom of the tubular portion of the mandrel 1. The spindle 3 is screw-threaded as at 4, and carries a collar 5, either rigidly secured to, or integral with said spindle 3, which serves the dual purpose of acting as a guide for the spindle within the tubular mandrel 1, and also as a shoulder against which the spring 6 may bear. Above the spring 6, and surrounding the spindle 3, is a sleeve 7, the upper end of which is provided with a spiral cam 8 and shoulder 9. Adjacent to the shoulder 9 a short section 10 of the cam, is cut away at right angles to the axis of the sleeve 7. The spindle 3 is provided with a cylindrical portion 11, from which the downwardly projecting cam 12 extends parallel to the axis of the spindle. Next above the cylindrical portion 11, is a squared portion 13, and finally the knurled handle 14. When the parts of the spindle are assembled, as shown in Fig. 6, the spring 6 is under considerable compression between the lower end of the sleeve 7, and the rigid collar 5. It will be noted now, that if the sleeve 7 is rotated around the spindle 3, the cam 8 on the sleeve will cause said sleeve to slide up and down on the spindle 3, or what amounts to the same thing, if the sleeve 7 is held rigid against rotation or longitudinal movement, the rotation of the spindle 3, within the sleeve 7, will cause said spindle to rise as the projection 12 rides up on the cam 8 to the horizontal part 10, the shoulder 9, of course, limiting the further rotation of the spindle. On the other hand, assuming the position of the spindle with the projection 12 upon the horizontal part 10 of the cam 8, after the spindle is rotated in the opposite direction with the sleeve held rigid, the spindle will be given a longitudinal motion downward. The sleeve 7 is held rigid within the tubular spindle 1, by means of a small set screw 15.

The lower end of the tubular part of the mandrel 1, is provided with a lateral opening or slot 16. Surrounding the mandrel, adjacent to this slot 16, is a collar 17, upon the upper face of which is rigidly secured, by means of the screw 18, an arm 19, which projects through the slot 16 and is provided upon its inner end with a screw-threaded aperture to receive the threaded end 4 of the spindle 3. The lower end of the mandrel 1 is provided with pinion teeth 20, by which the mandrel is driven through the driving gear 21. The mandrel is further provided with the worm wheel 22 which engages the worm 23 upon the governor shaft 24. The governor is of the usual brake disk type and the shaft 24 is mounted in bearings 25 and 26, which are carried by the frame 27 of the motor. The sliding brake disk 28 operates in the usual manner by being drawn back and forth on the shaft 24, as the governor balls 29 fly outwardly through centrifugal force.

Mounted upon any convenient part of the motor frame, as for example, the vertical standard 30, is a resilient brake spring 31 which extends adjacent to the mandrel 1, and just beneath the collar 17 with the forward end of said spring in position to engage the edge of the governor brake disk 28, when the collar 17 is in its lowermost position. The normal biasing of the brake spring 31, however, is away from the edge of the brake disk 28, so as to permit the governor shaft 24 to rotate freely.

The detachable meter shown in Fig. 1, is mounted upon the squared portion 13, of the spindle 3, as shown in Figs. 1 and 6. The meter consists of a shell or case 32, provided with a cover 33, rigidly secured thereto by means of the screws 34. The cover 33 is provided with a central opening or window 35, through which the dial 36 may be viewed. The sleeve shaft 37, projects through an aperture in the bottom of the case, being provided with a flange 38 to engage the bottom of the case 32 as shown in Fig. 4. A circular sleeve nut, 40 is screwed upon the upper end of the shaft down to a shoulder 41 leaving a space between the inner end of the sleeve nut 40 and the interior of the case. Mounted upon the sleeve nut 40 is the dial 36 above referred to. This dial is somewhat larger in diameter than the opening 35, and is provided upon its circumference with teeth for engagement with a smaller gear-wheel 42, which latter is rigidly mounted upon the stub shaft 43. The outer end of the stub shaft is provided with thumb-piece 44, by which the gear 42 may be rotated within the case and simultaneously with such rotation the dial 36 will also be rotated.

In order to hold the dial 36, in frictional engagement against the cover 33, as shown in Fig. 4, I provide the two-armed spring 45, securing the same in the bottom of the case by means of the screw 46 and permitting the two arms 47, 47, to straddle the sleeve nut 41, and bear upon the underside of the dial 36. Thus, the margin of the dial is made to bear with a considerable friction upon the underside of the cover 33, adjacent to the margin of the circular opening 35.

As above described, the sleeve nut 40 is somewhat larger than the aperture through the bottom of the case, and when in place is spaced away therefrom, thereby, forming the shoulder 48. Between the shoulder 48 and the bottom of the case I locate a circular, cambered spring-washer, 49, the purpose of which is to give a frictional resistance against the rotation of the sleeve-shaft 37 within the case. The dial 36 may rotate freely around the sleeve nut 40, such sleeve-nut merely serving as a circular mounting for the dial. In the bottom of the case 32, I locate a housing or guide 50, to receive a reciprocating rack 51. This rack engages a pinion 52, rigidly mounted upon the shaft 43. Upon the outer end of the rack 51 is the spring-finger 53 pivoted at 54 and provided with the stops 55 and 56 to limit its pivotal movement. In order to resiliently maintain the spring-finger 53 in the position indicated in Figs. 1 and 3, I locate a spring push-pin 57 in a socket 58 in the end of the rack 51 so as to bear upon the stop 56.

The sleeve shaft 37 is provided with a squared central aperture 59 to fit over the squared portion 13 of the spindle 3.

From the description of the device thus far given it will be seen that the rotation of the thumb-piece 44 will simultaneously reciprocate the rack 51 and with it the finger 53, and also rotate the dial 36. It will also be seen that the divisions upon the dial with the index-pointer 60 may be utilized to indicate the extent to which the rack 51 is projected from the case.

When used in connection with a phonograph record the parts will be substantially in the relative position shown in Fig. 1, with the meter mounted upon the spindle at the upper end of the mandrel and above the phonograph record 61 with the meter revolving along with the record.

In most of the disk records now on the market it is found that quite a number of the inner convolutions of the spiral groove do not have the sound vibration recorded therein. The reason for this is, that in the making of the record the motor is permitted to run for some little time after the sound waves have ceased to be impressed upon the recording diaphragm, leaving the recording stylus to continue making the spiral groove in the record tablet. The inner convolution is therefore no longer a safe guide for regulating the stop mechanism. For that reason I give each record to be played in connection with my improved stop mechanism a particular number, such number to be determined by the position of the pointer 60 upon the dial 36, when the spring-finger 53 is in position to engage the stylus 62 of the sound-box 63, when such stylus has traversed the last record-groove in the tablet 61 which carries the sound wave. This position is determined separately and individually, for each record and the number indicated upon the dial for each record is placed upon the record itself in some permanent manner. Thus, for example, suppose as in Fig. 1, it has been found by trial that when the finger 53 is in position to engage the sound box stylus for the last sound groove when the pointer 60 indicates 80 upon the dial; then the number to be applied to that record will be 80. This indicates that whenever this record is to be reproduced in connection with the meter and stop-mechanism, the meter is to be set at 80 and the mechanism will be set in operation to stop the motor immediately upon the completion of the record, irrespective of the number of additional convolutions in the spiral groove on the face of the record.

When the stylus 62 reaches the point on the face of the record where it will engage the spring-finger 53, the further rotation of the meter will be arrested, but, since the meter is connected with the spindle 3, the continued rotation of the mandrel 1 and sleeve 7, will cause the projection 12 to ride from the high portion of the cam 8 to the lower portion of the same, and thereby producing a vertical downward movement of the spindle 3, carrying with it the collar 17 under the impulse of the spring 6, but the downward movement of the collar 17 will carry with it the brake spring 31, causing its outer end to bear with considerable pressure upon the edge of the brake disk 28, and thereby immediately arresting the rotation of the governor and consequently stopping the motor. The threading of the spindle 3 into the apertured arm 19, serves the additional purpose of giving the collar 17 a slightly greater motion along the mandrel 7, than would be produced by the cam 8 alone; but since the cam 8 must be limited, slightly less than the circumference of the sleeve 7, and all of the parts must be contained in the interior of the mandrel 1, the easy working of the parts require that the cam 8 should be a spiral of comparatively short pitch; otherwise the friction of the cam 12 against the cam 8 would make the parts work hard. By threading the lower ends of the spindle 3 at 4, I am enabled to produce the requisite added travel of the collar 17 so as to produce the requisite brake pressure upon the edge of the brake disk 28.

It will thus be seen that I have provided a mechanism exceedingly simple in construction and easy to manipulate, whereby, in connection with what may be termed calibrated records, the driving motor will be automatically stopped upon the completion of the record.

I claim:

1. In a stop mechanism for talking machine motors, the combination of the record driving mandrel, a meter provided with an index arm mounted upon said mandrel to rotate therewith, an indicator carried by the meter, and friction brake mechanism associated with said meter and mandrel for stopping said mandrel upon arresting the rotation of said index arm.

2. In a stop mechanism for talking machine motors, the combination of a record driving mandrel, a meter concentric with said mandrel, means for connecting said mandrel and said meter to cause the same to normally rotate together, an indicator carried by the meter, and a friction brake mechanism actuated by the stopping of said meter to gradually stop the rotation of said mandrel.

3. In a stop mechanism for talking machines, the combination with the record driving mandrel, of a meter detachably connected with said mandrel to rotate therewith, an indicator carried by the meter, and means associated with said meter and said mandrel, actuated by the stopping of the rotation of said meter and acting through said mandrel, to gradually bring the same to a stop.

4. In a stop mechanism for talking machine motors, the combination with a rotating record driving mandrel, brake mechanism, a meter detachably connected to said mandrel to rotate therewith, an indicator carried by the meter, an adjustable spring-finger mounted upon said meter and capable of being adjusted toward and away from the center of rotation thereof, and mechanism connecting said meter and said mandrel, said mechanism actuated by the contact of said spring-finger with an external object to stop the rotation of said meter and simultaneously actuate said brake mechanism to stop the rotation of said mandrel.

5. In a stop mechanism for talking machine motors, the combination with a record driving mandrel, a meter, means for connecting said meter to said driving mandrel to cause said meter to rotate with said mandrel, an indicator carried by the meter, a friction brake mechanism, and means actuated by the stopping of the rotation of said meter to operate said friction brake mechanism to gradually stop the rotation of said mandrel.

6. In a stop mechanism for talking machine motors, the combination of a record driving mandrel and the regulating governor, gear mechanism between said mandrel and said governor for rotating said governor, a meter mounted to normally rotate with said mandrel, an indicator carried by the meter, and mechanism associated with said meter and operating through the rotation of said mandrel to stop the rotation of said governor and mandrel upon the stopping of the rotation of said meter.

7. In a stop mechanism for talking machines, the combination of a tubular record driving mandrel, and a regulating governor driven by said mandrel, a spring brake mechanism mounted adjacent to said governor for contact with a part thereof, a spindle located within said tubular mandrel, a collar mounted upon said mandrel for engagement with said spring brake, and means for reciprocating said spindle within said tubular mandrel to cause said collar to depress said spring brake into engagement with a part of said governor to stop the same.

8. In a stop mechanism for talking machine motors, the combination with a governor having a brake disk thereon, a rotating mandrel having gear connections with said governor to drive the same, a spring brake rigidly mounted upon the motor frame in position for engagement with said brake disk, a reciprocating spindle within said tubular mandrel, an external collar on said mandrel connected to said spindle, and means for reciprocating said spindle within said mandrel to cause said collar to depress said spring brake upon said brake disk and thereby stop the rotation of said governor.

9. In a stop mechanism for talking machines, the combination of a governor having a brake disk associated therewith, a record driving mandrel having gear connections with said governor to drive the same, said mandrel being tubular for a portion of its length, a reciprocating collar mounted upon said mandrel, a spring brake mounted upon the frame of said motor adjacent to said collar for engagement therewith and with said brake disk, a spindle within said tubular mandrel having a connection with said collar, and means for reciprocating said spindle to depress said collar upon said spring brake and thereby stop the rotation of said governor.

10. In a stop mechanism for talking machine motors, the combination of a motor having a brake disk mounted upon the shaft thereof, a record driving mandrel having gear connections with the shaft of said governor to drive the same, brake mechanism mounted upon the frame of said motor adjacent to said collar in position to bear upon said brake disk, and means within said mandrel for depressing said collar against said brake mechanism to apply a braking pressure to said brake disk.

11. In a stop mechanism for talking machine motors, the combination of a governor having a brake disk mounted upon the shaft thereof, a record driving mandrel having gear connections with the shaft of said governor to drive the same, a spring brake mounted upon the frame of said motor in position for engagement with said brake disk, and reciprocating means associated with said mandrel for applying said spring brake to said brake disk.

12. In a stop mechanism for talking machines, the combination of a governor having a brake disk mounted upon the shaft thereof, a spring brake mounted upon the frame of the motor in position for engagement with said brake disk, a collar mounted to reciprocate upon said mandrel in position for engagement with said spring brake, a reciprocating spindle within said mandrel having an external connection with said collar, and means connected with said spindle for reciprocating the same to actuate said brake mechanism and thereby stop the motor upon a predetermined number of revolutions of said mandrel.

13. In a stop mechanism for talking machine motors, the combination of a tubular record driving mandrel and a ball governor, a brake disk mounted upon the shaft of said governor, gear connection between said mandrel and the shaft of said governor for rotating said governor, a spindle within said tubular mandrel, a collar mounted upon said mandrel and having a connection with said spindle, a spring brake mounted upon the frame of said motor adjacent to said collar and in position for engagement with said brake disk, a meter detachably connected to said spindle to rotate therewith, an adjustable arm connected to said meter and means connected with said spindle and mandrel whereby the stopping of the rotation of said arm will cause said spindle to slide longitudinally within said tubular mandrel and through its connection with said collar depress the same and thereby set said spring brake against said brake disk.

14. In a stop mechanism for talking machine motors, the combination of a record driving mandrel, a meter mounted upon said mandrel, a radially extensible index arm upon said meter, means upon said meter for indicating the degree of extension of said arm, connections between the index arm and the indicating means, and friction brake mechanism associated with said meter and mandrel for stopping the rotation thereof upon arresting the rotation of said index arm.

15. In a stop mechanism for talking machine motors the combination of a record driving mandrel, a meter concentric with said mandrel, means for connecting said mandrel and said meter to cause them to normally rotate together, a radially extensible arm upon said meter, means for indicating the degree of extension of said arm, geared connections between the arm and indicating means, and a friction brake mechanism associated with said mandrel and meter for stopping said mandrel upon arresting the rotation of said arm.

16. In a stop mechanism for talking machine motors, the combination of a sound box stylus for traversing the sound record, a driving mandrel for rotating said record, a meter having an extensible arm thereon, said meter being mounted concentric to said mandrel, means connecting said meter and mandrel to cause them to normally rotate together, means for indicating the degree of extension of said arm, means upon said arm to engage said stylus at a predetermined point in the traverse of said stylus across the record to arrest the rotation of said meter, and brake mechanism associated with said meter and mandrel for stopping the rotation of said mandrel when the rotation of said meter is thus arrested.

17. In a stop mechanism for talking machine motors, the combination of a record driving mandrel, and brake mechanism for stopping the rotation thereof, with a meter mounted concentric to said mandrel to rotate normally therewith, an extensible arm, a graduated dial, a fixed pointer upon said meter, geared connections between said dial and arm, whereby the degree of the extension of said arm will be indicated upon said dial, and a connection between said meter and said brake mechanism for actuating the same to stop the rotation of said mandrel when said extensible arm is arrested by contact with the stylus of the talking machine sound box.

18. In a stop mechanism for talking machine motors, the combination of the record driving mandrel and brake mechanism for stopping the same, with a meter for determining the point at which the stopping shall occur, said meter comprising a case having a graduated rotatable dial therein, and a fixed pointer thereon, an extensible arm mounted in said case, gear connections between said dial and arm, and means for manually operating said gear connections to simultaneously extend said arm and rotate said dial whereby the degree of such extension will be indicated upon said dial.

19. In a meter for talking machine stop mechanism, the combination of a case, a graduated dial, and an extensible arm mounted in said case, gear connections between said dial and arm, and means for manually operating said gear connections to extend said arm, and rotate said dial whereby the degree of extension of said arm is indicated upon said dial.

PLINY CATUCCI.